Figure 1:
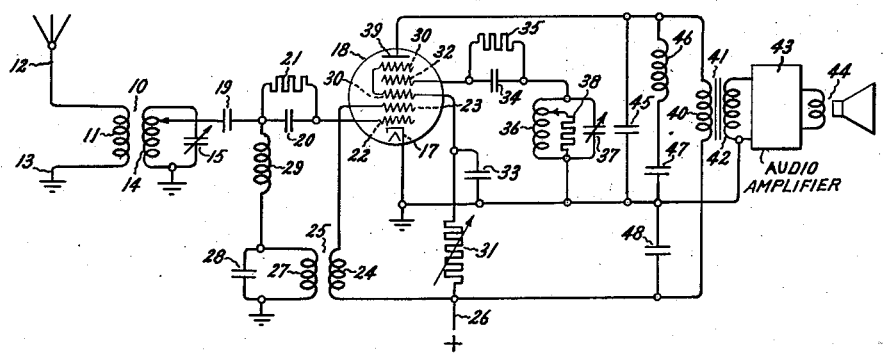

May 30, 1939.  R. C. JENSEN  2,160,663
SUPERREGENERATIVE DETECTOR CIRCUIT
Filed Feb. 18, 1938  2 Sheets-Sheet 1

Inventor:
Richard C. Jensen,
by Harry E. Dunham
His Attorney.

Inventor:
Richard C Jensen,
by Harry E. Dunham
His Attorney.

Patented May 30, 1939

2,160,663

UNITED STATES PATENT OFFICE 2,160,663

SUPERREGENERATIVE DETECTOR CIRCUIT

Richard C. Jensen, Scotia, N. Y., assignor to General Electric Company, a corporation of New York Application February 18, 1938, Serial No. 191,221

16 Claims. (Cl. 250—20)

My invention relates to improvements in detectors for high frequency signalling apparatus and more particularly to improvements in superregenerative detectors used to demodulate modulated high frequency signal oscillations.

Detectors employing the principle of regeneration have been known and used in high frequency signalling apparatus for many years. The limit to which regenerative detection can be carried is the point at which the detector tube starts to oscillate, the beginning of oscillations making further regenerative amplification impossible. It was to overcome this limitation that the superregenerative detector circuit was devised in the early part of the last decade. The superregenerative detector is essentially similar to the ordinary regenerative type of detector but has additionally a local source of super-audible oscillations which are introduced into the detector circuit in a manner to vary the detector's operating point at a uniform rate. The introduction of this local oscillation, known as the "quench" or "interruption" oscillation, so controls the operation of the superregenerative detector that the detector can oscillate at the signal frequency only when the moving operating point is in a region suitable for the production of oscillations. The constant interruption of oscillations in the detector circuit enables a consequent amplification of the signal in the detector to relatively tremendous proportions, the amplification having been estimated to be of the magnitude of 50,000 to 100,000 times. The superregenerative detector is, therefore, extremely sensitive.

Superregeneration in detector circuits has been relatively difficult to obtain at frequencies lower than about 15 megacycles. Even at those frequencies where superregenerative detection is feasible, the prior detector circuits do not possess the property of discriminating between signals of different frequencies with the result that the selectivity of these detectors has been very poor. Additionally, these superregenerative detector circuits, when connected directly to an antenna circuit, are capable of severe radiation and a consequent interference with other receivers operating in the immediate neighborhood. The undesirable characteristics of poor selectivity and strong radiation which are characteristic of the prior superregenerative detectors are partially overcome by adding one or more stages of radio frequency amplification between the superregenerative detector and the antenna circuit. However, these superregenerative detectors work best when their grid circuit is heavily loaded. This necessitates tight coupling of the detector to the preceding radio frequency stage of amplification with a consequent material loss of maximum possible selectivity. In practice, the value of coupling finally adopted in a particular installation has generally been a compromise considering the factors of both selectivity and sensitivity.

The prior superregenerative detectors additionally have an undesirable characteristic which arises from the high noise level that usually obtains in this form of detector. The noise level is so high, even under the most favorable adjustment of the circuit constants, that the reception of weak signals, which might be suitably detected by other forms of detection, is impossible in the superregenerative detector. This condition frequently has necessitated for the proper operation of a particular installation the use of carrier-off noise suppression equipment.

It is an object of my invention to overcome the defects which are characteristic of the prior superregenerative detectors without sacrificing any of the desirable qualities of this form of detection.

A further object of my invention is to provide a superregenerative detector which is distinguished by the characteristics of high selectivity and freedom from radiation and which, therefore, dispenses with the need of any radio frequency amplification between the detector and the antenna circuit.

Another object of my invention is to provide a superregenerative detector which is capable of improved operation at signal frequencies materially lower than about 15 megacycles and which, therefore, overcomes one of the serious defects which is characteristic of the prior superregenerative detectors.

A still further object of my invention is to provide a superregenerative detector which is characterized by a noise level materially lower than that usually obtained in prior superregenerative detectors, without sacrificing any of the desirable qualities of this form of detection, and which thereby greatly increases the sensitivity of the detector to weak signals. The low noise level resulting from my invention may dispense, except in the most severe cases, with any need for the additional equipment necessary to provide carrier-off noise suppression.

Figure 3:
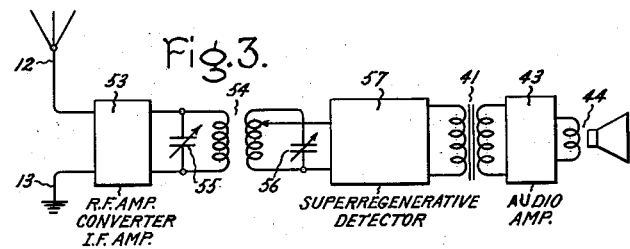
Figure 2:
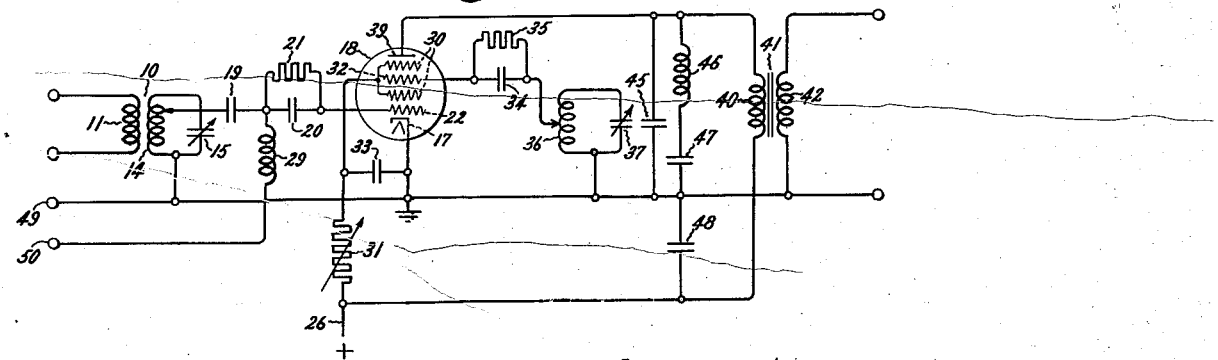
Figure 4:
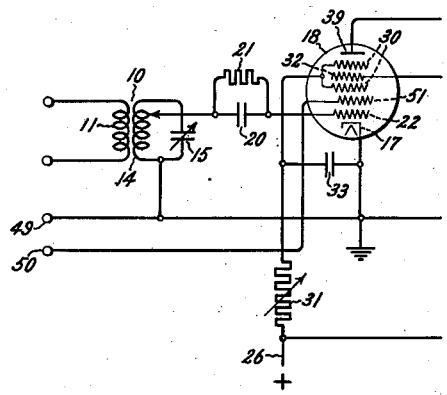
Figure 5:
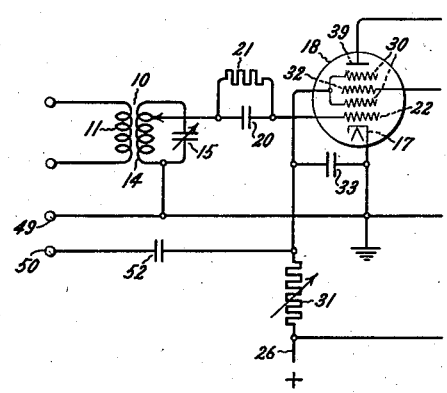
Figure 6:
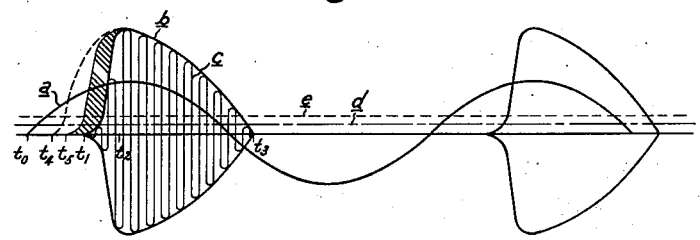
Figure 7:
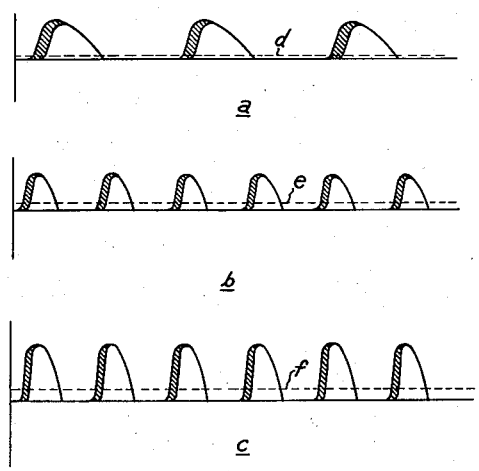
Figure 8:
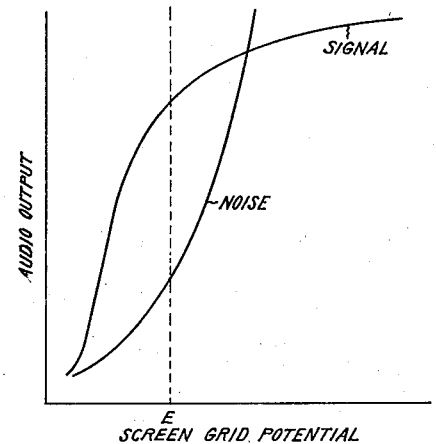

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 illustrates an embodiment of my invention in a superregenerative detector circuit of the type commonly known as "self quenched"; Figs. 2, 4 and 5 represent an embodiment of my invention in a superregenerative detector circuit having a separate quench oscillator and illustrate several methods of introducing the quench voltage into the detector circuit; Fig. 3 represents in conventional manner a superheterodyne radio receiver and illustrates my invention as embodied in the second detector circuit; and Figs. 6, 7 and 8 are graphs which more fully explain the theory of operation and the proper adjustment of the circuit constants of my invention in accordance with my present knowledge.

Referring to Fig. 1 of the drawings, I have illustrated my invention as embodied in a simple form of superregenerative receiver provided with an antenna transformer 10 having a primary 11 connected in an antenna ground circuit 12, 13 and having a secondary 14 tuned by a variable condenser 15 to the frequency of a desired signal oscillation. The tuned circuit 14, 15 is connected directly to the cathode 17 of an electron discharge device 18 and is connected through a blocking condenser 19 and a parallel connected grid condenser 20 and grid leak 21 to a first grid 22 of the electron discharge device 18.

A grid 23 of the electron discharge device 18 constitutes the anode of a local quench oscillator of relatively low though super-audible frequency, as compared with the frequency of the signal oscillation, provided for the purpose of quenching oscillations of the superregenerative circuit as will be described in greater detail hereinafter. The grid 23 is connected through a primary 24 of an oscillation transformer 25 to the positive terminal 26 of a source of space current of relatively high potential, the negative terminal of the space current source being connected to the cathode of the electron discharge device 18 in a well-known manner. The oscillation transformer 25 has a secondary 27 which is tuned by a condenser 28 to a desired quench frequency, the tuned circuit 27, 28 being connected directly to the cathode 17 and through a radio frequency choke 29 and the condenser 20 to the grid 22 of the electron discharge device 18. The grid 22, as is well understood in the art, is physically positioned between the grid 23 and the cathode 17 in order that the grid 22 may have the negative resistance characteristic necessary for the generation of oscillations in the tuned circuit 27, 28.

The electron discharge device 18 has a screen grid 30 which is connected through a variable resistance 31 to the positive terminal 26 of the high voltage source.

The screen grid 30 electrostatically shields a grid 32 from the remaining elements provided in the electron discharge device 18. A condenser 33 is used to maintain the screen grid 30 at ground potential for oscillations of signal and quenching frequency.

The grid 32 of the electron discharge device 18 is connected through a parallel connected grid condenser 34 and grid leak 35 and through a parallel connected inductance 36 and condenser 37 to the cathode 17. The condenser 37 is shown as of the variable type and serves to tune the resonant circuit, comprised by the inductance 36 and condenser 37, substantially to the frequency of the desired signal oscillation. Since the resonant circuit 36, 37 need be tuned only substantially to the frequency of the signal oscillation for proper operation of this superregenerative circuit, the condenser 37 may be mechanically connected to the condenser 15 for uni-control operation. A resistor 38 is connected across a portion of the inductance 36 for a reason to be disclosed hereinafter.

The anode 39 of the electron discharge device 18 is connected through the primary 40 of an audio frequency transformer 41 (or through any other suitable translating device) to the positive terminal 26 of the high voltage space current supply source. The transformer 41 has a secondary 42 which supplies the audio frequency components of the modulated signal oscillation to an audio frequency amplifier represented conventionally by the rectangle 43. The output of the audio amplifier 43, which may comprise any desired number of stages of audio frequency amplification, is supplied to a translating device 44 which may be a loud speaker. A condenser 45 maintains the anode 39 of the electron discharge device 18 at ground potential for oscillations of signal frequency while a series resonant circuit, comprised by the inductance 46 and condenser 47 tuned to the frequency of the quenching oscillations, maintains the anode 39 at ground potential for oscillations of quenching frequency. A condenser 48 maintains the positive terminal 26 of the high voltage source at ground potential for oscillations of signal, quenching and audio frequencies.

The operation of my superregenerative receiver will best be understood by reference to Figs. 6 to 8 inclusive of the drawings. The action of the receiver using superregeneration is in general quite complicated, especially when receiving signal oscillations of ultra-high frequency. The fundamental principle of superregeneration, however, is based on the impression of a low frequency variation, usually called "quench action", which changes the effective resistance of the oscillatory circuit periodically. This quenching action may be accomplished by varying either the anode voltage or the grid bias voltage of the detector tube. The arrangement of Fig. 1 utilizes the grid bias method of introducing the quench voltage into the detector circuit.

Referring more particularly to Fig. 6 of the drawings, the curve $a$ represents the quenching voltage which is generated in the oscillatory circuit 27, 28 and which is impressed through the choke 29 on the grid 22 of the electron discharge device 18. It should be noted at this point that the choke 29 serves to isolate the relatively high signal oscillations from the oscillatory circuit 27, 28 while the condenser 19 effectively isolates the relatively low frequency quenching oscillations from the oscillatory circuit 14, 15. The curve $b$ of Fig. 6 represents the envelope of the oscillations, represented as $c$, which appear in the oscillatory circuit 36, 37 under control of the quenching oscillations. That phase of the operation of my circuit which has to do with the production of oscillations in the oscillatory circuit 36, 37 is not entirely understood, but I will explain the operation as I now understand it to be.

The grid 32 of the electron discharge device 18 is connected through the biasing condenser 34 and resistor 35 to one end of the oscillatory circuit 36, 37 while the anode 39 is effectively connected through the condenser 45, for oscillations of signal frequency, to the other side of the oscillatory circuit 36, 37. I believe that a virtual cathode forms between the cathode 17 and the grid 32 to constitute with the oscillatory circuit 36, 37 an oscillator of the so-called Colpitts type. However, it has been suggested in explanation of the theory of operation that the transit time phenomenon of the electron discharge device 18 is the cause of the oscillations in the oscillatory circuit 36, 37. This phenomenon is based on the use of a screen grid which electrostatically shields the oscillatory grid and arises by virtue of the saturation effect caused by the influence of the screen grid, with its positive potential, on the electron stream from the cathode. Either the theory of operation which I advance or the suggested transit time phenomenon theory of operation accounts for the negative resistance characteristic of the grid 32 which is essential to the generation of oscillations in the oscillatory circuit 36, 37.

The quenching voltage impressed on the grid 22 of the electron discharge device 18 electronically controls the resistance characteristic of the grid 32 to allow and to terminate the generation of oscillations in the oscillatory circuit 36, 37. That is, the quenching voltage allows the grid 32 to acquire a negative resistance characteristic and oscillations thereupon build up in the oscillatory circuit 36, 37. A short interval later, the quenching voltage causes the grid 32 to lose its negative resistance characteristic whereupon the generation of oscillations in the circuit 36, 37 ceases. The oscillatory energy, which is stored in the oscillatory circuit 36, 37 when the generation of oscillations ceases, is dissipated in the resistance of this circuit comprised by the inherent resistance of the inductance 36, by the resistance of the condenser 37, and by the resistor 38. This cycle of operation constituted by the building up and decay of oscillations in the oscillatory circuit 36, 37 is known as a single complete quench cycle, the envelope of which is represented by the curve $b$ of Fig. 6.

The initiation of oscillations in the oscillatory circuit 36, 37 at the beginning of a quench cycle is electronically influenced not only by the control of the quenching voltage but also by that of the signal voltage, both of which are impressed on the grid 22 of the electron discharge device 18. As soon as the restraining action of the quench voltage is removed during its first half cycle, oscillations in the oscillatory circuit 36, 37 are initiated, assuming the absence of a signal voltage, by causes internally of the electron discharge device 18, which I believe to be in the nature of the so-called shot effect, the flicker effect, thermal agitation, etc. In point of time, it will be seen from Fig. 6 that the quenching voltage passes through zero at the time $t_0$ and that oscillations begin, due to the causes which I have mentioned, in the oscillatory circuit 36, 37 at time $t_1$. The restraining influence of the quenching voltage is exerted at about the time $t_2$ and the oscillations in the oscillatory circuit 36, 37 are completely damped out by the resistance of the oscillatory circuit at the time $t_3$ to complete the quench cycle. The presence of a signal voltage upon the grid 22 of the electron discharge device 18 has the effect of advancing the time at which oscillations are generated in the oscillatory circuit 36, 37. This effect is known as the "time of advance" and will vary with the instantaneous magnitude of the signal potential which is impressed on the grid 22. A relatively high signal potential will cause a relatively large time of advance at $t_4$ in Fig. 6 whereas a lesser signal potential will cause a lesser advance as $t_5$. Thus the time of advance is dependent almost entirely, assuming a constant signal carrier intensity, upon the instantaneous modulation of the signal carrier wave.

From this explanation of the quenched oscillatory operation, it will be at once apparent that when a bias is impressed on the grid 32 of the electron discharge device 18 by the biasing condenser 34 and the resistor 35 through rectification of the oscillations in the oscillatory circuit 36, 37 then, assuming for simplicity the characteristic of the detector to be linear, the average anode current in the output circuit changes in proportion to the difference of area of the envelope of the several quench cycles. As previously pointed out, these differences of area vary with differing values of instantaneous modulation of the signal carrier with the result that the modulation components of the signal oscillation are reproduced in the anode circuit. This will perhaps be clearer by further reference to Fig. 6 of the drawings. The increase of the area under the envelope of the quench cycle which is the result of an advance time $t_5$ (shown cross-hatched) will, with detection, result in a change of average anode current proportional to the mean value of the shaded area, as indicated by the broken line $d$. Likewise an advance time $t_4$ will result in further changing the detected anode current as indicated by $e$. These changes in the value of average anode current, which follow the envelope of the modulated signal carrier, are supplied through the audio frequency transformer 41 to the audio frequency amplifier 43 and are transformed by the translating device 44.

The particular value of the positive potential supplied to the screen grid 30 of the electron discharge device 18 is important from the standpoint of obtaining maximum sensitivity consistent with low noise level, the optimum value depending in large part upon the particular type of electron discharge device 18 which is used and upon the circuit constants.

Where the potential for the screen grid is obtained from the positive terminal 26 of the high voltage supply through a voltage reducing resistor 31 as shown in Fig. 1, the resistor 31 has an optimum value of resistance for each installation. The curves of Fig. 8 show graphically the relation which I have found to exist between the signal audio output and the noise output of the receiver as a function of the positive potential applied to the screen grid 30. Since the noise level is the ultimate limiting factor to the reception of weak signals, it is important to maintain the signal audio output at a maximum consistent with a low noise level. The relationship between the signal audio output and the noise output is not linear with respect to the applied screen grid potential and an optimum value of screen potential $E$, as indicated by the broken vertical line on Fig. 8, will be found in which a condition of maximum audio output consistent with low noise output obtains. I have found, for example, that a screen grid potential of 39 volts is quite satisfactory when using a type 6L7 electron discharge device with 225 volts on the anode.

The screen grid 30 has the very important additional function in my circuit arrangement of shielding the grid 32 from the grid 22 effectively to prevent the radiation from the antenna ground system 12, 13 of oscillations generated in the oscillatory circuit 36, 37. A receiver embodying my invention thus operates without interference to other receivers operating on the same frequency in the immediate neighborhood.

The frequency and amplitude of the quenching oscillations impressed on the grid 22 of the electron discharge device 18 also have an optimum value that likewise is determined by the type of electron discharge device 18 which is used and by the circuit constants of a particular installation. This will be more evident from the curves of Fig. 7 which represent graphically how the area under the envelope of a quenching cycle varies with the frequency and amplitude of the quenching oscillations. Only the positive half cycle of the oscillations in the oscillatory circuit 36, 37 are shown for purposes of simplicity and in Fig. 7a, three quench cycles are shown with the differences in the quench cycle area caused by the time advance indicated by the shaded portion. The change in average anode current caused by the shaded areas is represented by the broken line d. Assume this to be small so as to indicate very poor sensitivity. If the intensity of the signal oscillations and the amplitude of the quenching oscillations are maintained constant but the frequency of the quenching oscillations is increased as indicated by Fig. 7b, the number of shaded areas per unit of time will be increased and the average anode current will therefore change in proportion to the amount e as indicated by the broken line. The sensitivity is thus increased by increasing the frequency of the quench oscillations. If, again, the signal intensity is maintained constant and the frequency of the quench oscillations are the same as in Fig. 7b but the amplitude of the quenching oscillations is increased, a further change occurs. The amplitude of the shaded area increases since the oscillations in the oscillatory circuit 36, 37 may reach a greater amplitude before being quenched. The net result of this change as the amplitude of the quenching oscillations is increased from a minimum is an increase in each shaded area and the average anode current changes in proportion to the value f as indicated by the broken line in Fig. 7c. The sensitivity of the receiver will therefore be again increased. While the quench oscillation frequency and amplitude is not critical but may vary within wide limits, there are obvious limits to increasing the sensitivity by increasing the amplitude and frequency of the quenching oscillations and an optimum value is adopted in practice which provides maximum sensitivity in the operation of the superregenerative circuit. As illustrative of suitable values in this regard, a quench frequency of 20 kilocycles and a quench voltage of 1.0 peak volts has been found satisfactory when using a 6L7 type of electron discharge device in a circuit tuned to receive a signal having a frequency of 42 megacycles.

The portion of the inductance 36 which is shunted by the resistor 38 has an optimum value for proper operation of the superregenerative detector. This adjustment is dependent upon the particular electron discharge device 18 which may be used and by the circuit constants. While the use of the resistor 38 greatly improves the over-all operation, and especially the selectivity, of the superregenerative receiver, the reason for the improved operation is not entirely known. According to my present knowledge, the resistor 38 plays a dual role. First, the resistor 38 balances the positive resistance of the oscillatory circuit 36, 37 to the negative resistance characteristic of the grid 32 with respect to the cathode 17 of the electron discharge device 18 thereby to greatly improve the selectivity of the oscillatory circuit 36, 37 by increasing the impedance across the terminals of this circuit to oscillations of a frequency to which the circuit is tuned, and secondly, the resistor 38 aids the positive resistance inherent in the inductance 36 and the capacitor 37 in quickly damping the oscillations in the oscillatory circuit 36, 37 after the generation of these oscillations is terminated under control of the quenching voltage. The second function performed by the resistor 38 is very desirable as that portion of the quench cycle in which the oscillations are being damped out has no useful effect in the operation of the superregenerative receiver and further limits the frequency which the quenching oscillations may have since it is quite necessary that one quench cycle must be completed before a second quench cycle begins. Where one quench cycle is not substantially completed before a second quench cycle begins, the oscillations of the circuit 36, 37 are then initiated at the beginning of a quench cycle by the decaying oscillations of the previous quench cycle instead of the signal voltage. The sensitivity of the detector is thus greatly impaired. With a type 6L7 tube operating at 42 megacycles and provided with a separate quench oscillator, the use of which will be described in detail hereinafter, I have found that the resistor 38 may have a value of 5000 ohms and may be connected across only the lower 5 turns of an 8 turn inductance 36.

Fig. 2 shows a modification of my invention in which like reference characters are employed to designate like elements of Fig. 1. In this embodiment, provision is made for the use of a separate local oscillator to generate the damping oscillations. The output from the local oscillator, not shown, is connected between the terminals 50, 49 which are respectively connected to the grid 22 and cathode 17 of the electron discharge device 18.

An additional modification appears in the Fig. 2 arrangement in that the inherent resistance of the oscillatory circuit 36, 37 is alone used to obtain the result accomplished by the use of the resistor 38 in the circuit of Fig. 1. To this end, the grid 32 and cathode 17 of the electron discharge device 18 are connected to a selectable portion only of the inductance 36 having a value such that the portion of the total positive resistance in the circuit 36, 37 reflected to the grid 32 is approximately equal to the negative resistance of the latter grid. My preferred embodiment, however, provides the resistor 38 in the connection shown in Fig. 1 since this arrangement utilizes the entire oscillatory voltage developed across the circuit 36, 37 while enabling a much more minute adjustment of the positive resistance. The consequent operation of the Fig. 1 arrangement in this respect is materially better than that of the Fig. 2 arrangement.

The detailed operation of the embodiment illustrated in Fig. 2 is the same as that of Fig. 1 and will not be repeated.

Figs. 4 and 5 of the drawings illustrate two additional modifications of my invention. In each of these figures, like characters are used to designate like elements of Fig. 1, and the right-hand portion of each figure is not completed for purposes of simplicity but is understood to be the same as that of Fig. 1. Fig. 4 illustrates the use in the electron discharge device 18 of an additional grid element 51 upon which the quenching oscillations are impressed. Fig. 5 illustrates an arrangement wherein the damping oscillations are impressed through a blocking condenser 52 upon the screen grid 30 of the electron discharge device 18. It will be apparent from these modifications that the damping oscillations may be introduced into the superregenerative circuit in many ways other than those shown, it being only necessary that the damping oscillation shall influence the negative resistance characteristic of the grid 32. The operation of the embodiment illustrated in Figs. 4 and 5 is the same as that of Fig. 1 and will not be again repeated.

While I have illustrated my invention as embodied in a superregenerative detector directly connected to an antenna ground circuit 12, 13, it will be understood that my superregenerative receiver is equally suited for other uses as, for example, for use in a superheterodyne type of radio receiver as illustrated by the arrangement of Fig. 3 wherein like characters are used to designate like elements of the Fig. 1 arrangement. In this figure, the converter and intermediate frequency stages of amplification of a superheterodyne receiver are conventionally indicated by the rectangle 53 which may comprise in addition to a converter, or other well known form of frequency changes, as many stages of radio frequency and intermediate frequency amplification as desired. The output of the last intermediate frequency stage of amplification is coupled through an intermediate frequency transformer 54, tuned by the condensers 55 and 56 to the intermediate frequency, to a superregenerative detector of the general type illustrated in Fig. 1 of the drawings but which is conventionally represented by the rectangle 57. The audio frequency output of the superregenerative detector 57 passes through an audio frequency transformer 41 and is amplified by an audio amplifier 43 for reproduction by a translating device 44. The operation of the superregenerative detector in this arrangement is the same as its operation would be in the embodiment illustrated in Fig. 1, the signal frequency being, however, the intermediate frequency appearing in the output of the superheterodyne receiver 53. It will be understood, of course, that my detector may not only be used as a second detector in a superheterodyne receiver, as illustrated by this figure, but is equally well adapted for use as the first detector of such a receiver.

While I have shown a particular embodiment of my invention, it will of course be understood that I do not wish to be limited thereto since many modifications may be made both in the circuit arrangement and the instrumentalities employed, and I therefore contemplate by the appended claims to cover any such modifications as fall within the true spirit and scope of my invention.

What I claim as new and desire to secure by Letters Patent of the United States is:

1. A superregenerative receiver comprising, in combination, an electron discharge device having an anode, a cathode, and a plurality of grids, means for impressing signal oscillations on a first of said grids, means for impressing oscillations of substantially signal frequency on a second of said grids, means for impressing quench oscillations on one of said grids, an output circuit connected to said anode and said cathode, and signal translating means in said output circuit.

2. A detector comprising, in combination, an electron discharge device having an anode, a cathode, a first, a second, and a third grid, means for impressing signal oscillations on said first grid, means for impressing oscillations of substantially signal frequency on said third grid, means including said second grid for shielding said first grid from said third grid, means for impressing a quench voltage on one of said grids, an output circuit connected to said anode and said cathode, and signal translating means in said output circuit.

3. The combination, in a radio receiver, of an electron discharge device having an anode, a cathode, a signal input grid, a screen grid, and an oscillator grid, means for impressing signal oscillations on said signal input grid, means for impressing oscillations of substantially signal frequency on said oscillator grid, means including said screen grid for electrostatically shielding said signal input grid from said oscillator grid, means for impressing quench oscillations on one of said grids, an output circuit including said anode and said cathode, and translating means in said output circuit.

4. A superregenerative detector comprising, in combination, an electron discharge device having an anode, a cathode, and a plurality of grids, means for impressing signal oscillations on a first of said grids, means for impressing oscillations of substantially signal frequency on a second of said grids, means including a third of said grids for electrostatically shielding said second grid from said first grid, means including a fourth of said grids for impressing an oscillatory quench voltage on one of said grids, an output circuit connected to said anode and said cathode, and signal translating means in said output circuit.

5. The combination, in a radio receiver, of an electron discharge device having an anode, a cathode, and a plurality of grids, an input circuit connected to a first of said grids and said cathode, means for supplying modulated signal oscillations to said input circuit, means for impressing oscillations of substantially signal frequency on a second of said grids, means including a third of said grids for electrostatically shielding said first grid from said second grid, a source of local quench oscillations, means for impressing the oscillations from said source on one of said grids, an output circuit including said anode and said cathode, and signal translating means in said output circuit responsive to the modulation components of said signal oscillations.

6. A superregenerative detector comprising, in combination, an electron discharge device having an anode, a cathode, and a plurality of grids, a tunable input circuit connected to a first of said grids and said cathode, means for supplying signal oscillations to said input circuit, an oscillatory circuit of relatively low frequency additionally connected between said first grid and said cathode, means including a second of said grids for producing sustained oscillations in said oscillatory circuit, means for impressing oscillations of substantially signal frequency on a third of said grids, means including a fourth of said grids for shielding said first grid from said third grid, an output circuit including said anode and said cathode, and signal translating means in said output circuit.

7. The combination in a superregenerative receiver, of an electron discharge device having an anode, a cathode, and a grid, a source of signal oscillations, means including an oscillatory circuit for impressing oscillations of substantially signal frequency on said grid, means utilizing said signal oscillations for initiating the generation of oscillations in said oscillatory circuit, a source of quench oscillations, means utilizing said quench oscillations for periodically terminating the generation of oscillations in said oscillatory circuit, means including a resistor connected across a selectable portion of said oscillatory circuit for balancing the positive resistance of said oscillatory circuit to the negative resistance of said grid, an output circuit connected to said anode and said cathode, and a translating device in said output circuit.

8. A superregenerative detector comprising, in combination, an electron discharge device having an anode, a cathode, and a plurality of grids, a source of signal oscillations, means for impressing said signal oscillations on a first of said grids, a source of quenching oscillations, means for impressing said quenching oscillations additionally on said first grid, said last named means including means for isolating said sources from each other, means for impressing oscillations of substantially signal frequency on a second of said grids, means including a third of said grids for electrostatically shielding said first grid from said second grid, an output circuit connected to said anode and said cathode, and signal translating means in said output circuit.

9. A superregenerative detector comprising, in combination, an electron discharge device having an anode, a cathode, and a plurality of grids, means for impressing signal oscillations on a first of said grids, means for impressing oscillations of substantially signal frequency on a second of said grids, means including a third of said grids for electrostatically shielding said first grid from said second grid, said last named means including a source of potential having an optimum value whereby said means connected to said second grid has a maximum signal response and a minimum noise response, means for impressing quenching oscillations on one of said grids and translating means connected between said anode and said cathode for producing indications from said signal oscillations.

10. The method of operating a superregenerative detector having a multi-grid electron discharge device, a signal input circuit, and a signal output circuit including a translating device, which comprises impressing modulated signal oscillations on a first of said grids, impressing an oscillation of substantially signal frequency on a second of said grids, impressing an optimum source of potential on a third of said grids electrostatically to shield said first grid from said second grid, impressing a quench oscillation on one of said grids, and translating the modulation components of the signal oscillations appearing in said output circuit.

11. The method of operating a superregenerative receiver having an electron discharge device including a grid and a cathode, a signal input circuit, an oscillatory circuit having positive resistance and being tunable substantially to the frequency of a desired modulated signal, and a signal output circuit, which comprises, periodically causing said grid to have a negative resistance with respect to said cathode, initiating by signals in said signal input circuit oscillations in said oscillatory circuit, impressing on said grid oscillations generated in said oscillatory circative resistance to terminate the generation of oscillations in said oscillatory circuit, adjusting the positive resistance of said oscillatory circuit to match the negative resistance of said grid, and utilizing the modulation components of the signal appearing in said output circuit.

12. In a superregenerative receiver, the combination of means including a first tuned circuit resonant at the frequency of a desired signal for receiving modulated signal oscillations, means including a second tuned circuit resonant substantially at the frequency of received signal oscillations for locally generating oscillations of substantially signal frequency, means for periodically terminating the generation of oscillations by said last named means, and means responsive to signals received in said first tuned circuit for periodically initiating the generation of oscillations by said local generating means, said last named means advancing in point of time the initiation of said generation of oscillations in response to increasing values in the amplitude of received signal oscillations.

13. In an superregenerative receiver, the combination of means including a first tuned circuit resonant at the frequency of a desired signal for receiving modulated signal oscillations, means including a second circuit resonant substantially at the frequency of received signal oscillations for locally generating oscillations of substantially signal frequency, means for periodically quenching the generation of oscillations by said last named means, means responsive to received signals for periodically initiating the generation of oscillations by said local generating means, the point of time of the initiation of said generation of oscillations depending upon the amplitude of received signal oscillations, a translating device, and means for supplying to said device potentials whose value is dependent upon the point of time at which the generation of oscillations is initiated.

14. The combination, in a superregenerative detector, of means for receiving modulated signal oscillations, means for locally generating oscillations of substantially signal frequency, means for periodically terminating the generation of oscillations by said last named means, and means responsive to received signal oscillations for electronically initiating periodically the generation of oscillations by said local generating means, said last named means advancing in point of time the initiation of said generation of oscillations in response to increasing values in the amplitude of received signal oscillations.

15. The combination, in a superregenerative detector, of means for receiving modulated signal oscillations, means for locally generating oscillations of substantially signal frequency, means for periodically terminating the generation of oscillations by said last named means, means responsive to received signal oscillations for electronically initiating periodically the generation of oscillations by said local generating means, said last named means advancing in point of time the initiation of said generation of oscillations in response to increasing values in the amplitude of received signal oscillations, a translating device, and means for supplying to said device a potential whose value varies in accordance with the point of time at which the generation of oscillations is initiated.

16. In a superregenerative receiver, the combination of a first and a second circuit tuned to resonance at a signal frequency, said second named circuit having resistance therein, an electron discharge device having grid and cathode elements, a connection of said grid and cathode elements to said second named circuit, means including said first named circuit for periodically establishing in the presence of signal oscillations a negative resistance between said grid and said cathode to generate oscillations in said second named circuit, means for periodically quenching said generation of oscillations, and means for matching the positive resistance of said first named circuit to the negative resistance of said grid whereby optimum selectivity of said receiver to a selected signal is effected.

RICHARD C. JENSEN.

CERTIFICATE OF CORRECTION.

Patent No. 2,160,663.  May 30, 1939.

RICHARD C. JENSEN.

It is hereby certified that error appears in the printed specification of the above numbered patent requiring correction as follows: Page 6, second column, lines 2 and 3, claim 11, strike out "cirative" and insert instead the words  circuit, periodically causing said grid to lose its negative; and that the said Letters Patent should be read with this correction therein that the same may conform to the record of the case in the Patent Office.

Signed and sealed this 18th day of July, A. D. 1939.

(Seal)

Henry Van Arsdale,
Acting Commissioner of Patents.